United States Patent
Wu et al.

(10) Patent No.: US 11,671,583 B2
(45) Date of Patent: Jun. 6, 2023

(54) VIDEO CONFERENCING SYSTEM AND TRANSMITTER THEREOF

(71) Applicants: BenQ Intelligent Technology (Shanghai) Co., Ltd, Shanghai (CN); BenQ Corporation, Taipei (TW)

(72) Inventors: Chen-Chi Wu, Taipei (TW); Chin-Fu Chiang, New Taipei (TW); Chia-Nan Shih, New Taipei (TW)

(73) Assignees: BENQ INTELLIGENT TECHNOLOGY (SHANGHAI) CO., LTD, Shanghai (CN); BENQ CORPORATION, Taipei (TW)

( * ) Notice: Subject to any disclaimer, the term of this patent is extended or adjusted under 35 U.S.C. 154(b) by 484 days.

(21) Appl. No.: 16/942,344

(22) Filed: Jul. 29, 2020

(65) Prior Publication Data
US 2021/0037234 A1    Feb. 4, 2021

(30) Foreign Application Priority Data

Aug. 1, 2019   (CN) .......................... 201910707624.X

(51) Int. Cl.
*H04N 17/00* (2006.01)
*G06F 13/42* (2006.01)
*G08B 5/22* (2006.01)
*H04N 7/15* (2006.01)

(52) U.S. Cl.
CPC ......... *H04N 17/00* (2013.01); *G06F 13/4282* (2013.01); *G08B 5/22* (2013.01); *G06F 2213/0042* (2013.01); *H04N 7/15* (2013.01)

(58) Field of Classification Search
CPC ........ H04N 17/00; G06F 13/4282; G08B 5/22
See application file for complete search history.

(56) References Cited

U.S. PATENT DOCUMENTS

2020/0272404 A1    8/2020  Mu

FOREIGN PATENT DOCUMENTS

| CN | 108763130 A | 11/2018 |
|---|---|---|
| CN | 110007883 A | 7/2019 |
| EP | 3220633 A1 | 9/2017 |
| JP | 2017097603 A | 6/2017 |
| TW | M567406 U | 9/2018 |

OTHER PUBLICATIONS

European Office Action and Search Report issued in corresponding to European Application No. 20188395.6 dated Dec. 23, 2020. (pp. 15).
Anwar Sadat et al: "Alternate Mode for USB Type-C: Going beyond USB", Oct. 21, 2016 (Oct. 21, 2016), XP055459059, Retrieved from the Internet: URL:http://www.ti.com/lit/wp/slly021 /slly021. pdf; [retrieved on Mar. 13, 2018]; (pp. 9).

*Primary Examiner* — Curtis B Odom
(74) *Attorney, Agent, or Firm* — Muncy, Geissler, Olds & Lowe, P.C.

(57) ABSTRACT

A video conferencing system is disclosed. The video conferencing system includes a transmitter and a receiver. When the transmitter is coupled to a port of an information processing device, the transmitter communicates with the information processing device to determine whether the port of the information processing device has video output function. When the above determination result is no, the transmitter emits a wireless signal. The transmitter is coupled to a display device and used to receive the wireless signal and provide a default warning message to the display device.

14 Claims, 7 Drawing Sheets

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

FIG. 7A

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | VBUS | SBU1 | D- | D+ | CC | VBUS | TX1- | TX1+ | GND |
| GND | TX2+ | TX2- | VBUS | VCONN |  |  | SBU2 | VBUS | RX1- | RX1+ | GND |
| B1 | B2 | B3 | B4 | B5 | B6 | B7 | B8 | B9 | B10 | B11 | B12 |

FIG. 7B

VIDEO CONFERENCING SYSTEM AND TRANSMITTER THEREOF

BACKGROUND OF THE INVENTION

1. Field of the Invention

The invention relates to video conference; in particular, to a video conferencing system and a transmitter thereof.

2. Description of the Prior Art

Compared to the conventional universal serial bus (USB) standard, the USB Type-C standard provides higher power transmission capability and data transmission speed, and the redesigned connector is smaller and more convenient to use.

Therefore, the information processing devices (e.g., the notebooks, etc.) commercially available are advertised as being equipped with the USB Type-C ports. However, based on sales strategies and cost considerations, different information processing devices typically employ different levels of USB functional configurations.

For example, a lower-priced information processing device is usually equipped with the USB Type-C port only supporting USB data transmission function; a medium-priced information processing device is usually equipped with the USB Type-C port supporting USB data transmission function and power transmission function (or video output function); a high-priced information processing device is usually equipped with the USB Type-C port simultaneously supporting USB data transmission function, power transmission function and video output function. In other words, not all information processing devices equipped with the USB Type-C port can support the video output function.

However, most users do not know whether the USB Type-C port of the information processing device used by them can support the video output function or not. Therefore, when the user wants to output a video through the information processing device, it may be failed because the USB Type-C port of the information processing device does not support the video output function, causing considerable trouble and inconvenience to the user.

For example, when a user wants to perform a video conference with another person through the information processing device, the user will connect the transmitter (TX) device of the video conferencing system to the USB Type-C port of the information processing device. At this time, if the USB Type-C port of the information processing device does not support the video output function, the information processing device fails to output video signal to the transmitter (TX) through the USB Type-C port, thereby the video conference could not be carried out smoothly.

At this time, the user may suspect that the information processing device or the video conferencing system is faulty, so that the video conference cannot be smoothly performed. However, the real reason is that the USB Type-C port the information processing device does not support video output function. Therefore, when the user connects the transmitter (TX) of the video conferencing system to the USB Type-C port of the information processing device, if the user can be explicitly informed whether the USB Type-C port of the information processing device supports video output function, the considerable trouble and inconvenience encountered by users should be effectively solved.

SUMMARY OF THE INVENTION

Therefore, the invention provides a video conferencing system and a transmitter thereof to solve the above-mentioned problems of the prior arts.

A preferred embodiment of the invention is a video conferencing system. In this embodiment, the video conferencing system includes a transmitter and a receiver. When the transmitter is coupled to a port of an information processing device, the transmitter is configured to communicate with the information processing device to determine whether the port of the information processing device has video output function or not. When the above determination result is no, the transmitter is configured to transmit a wireless signal. The transmitter is coupled to a display device and configured to receive the wireless signal and provide a default warning message to the display device.

In an embodiment, the default warning message is an image signal pre-stored by the transmitter and transmitted to the receive through the wireless signal.

In an embodiment, the default warning message is an image signal pre-stored by the receive, the display device is configured to receive the default warning message and directly display the default warning message.

In an embodiment, the port of the information processing device is a universal serial bus (USB) Type-C port, the transmitter is coupled to the port of the information processing device through a connecting cable supporting a USB Type-C alternate mode, the transmitter and the information processing device are configured to perform a power negotiation and exchange messages with each other.

In an embodiment, a USB device chip of the transmitter is configured to obtain an output mode setting of a USB host chip of the information processing device; if the output mode setting is not a DisplayPort output mode, the transmitter is configured to determine that the port of the information processing device has no video output function.

In an embodiment, when the transmitter transmits a communication message related to a USB Type-C alternate mode to the information processing device but fails to receive a response message from the information processing device, the transmitter is configured to determine whether the port of the information processing device has the video output function or not.

In an embodiment, when an image output trigger button of the transmitter is pressed, the transmitter is configured to determine whether the port of the information processing device has the video output function or not.

Another preferred embodiment of the invention is a transmitter. In this embodiment, the transmitter is applied to a video conferencing system. The video conferencing system further includes a receiver. The transmitter includes a communication circuit, a control circuit and a wireless transmitting circuit. When the transmitter is coupled to a port of an information processing device, the transmitter is configured to communicate with the information processing device. The control circuit is coupled to the communication circuit and configured to determine whether the port of the information processing device has a video output function or not. The wireless transmitting circuit is coupled to the control circuit. When a determination result of the control circuit is no, the wireless transmitting circuit is configured to output a wireless signal, and the receive is configured to receive the wireless signal and provide a default warning message to a display device.

Compared to the prior art, when the user connects the transmitter in the video conferencing system of the invention to the port of the information processing device, if the transmitter communicates with the information processing device and then determines that the port of the information processing device has no video output function, the transmitter will transmit a wireless signal to the receiver, and the receiver will provides a default warning message to the display device to notify the user that the information processing device used by the user has no video output function and fails to perform video conference.

By doing so, the user can clearly know that the real reason why the video conference cannot be smoothly carried out is that the information processing device has no video output function, and the user will not misunderstand that the information processing device or the video conference system is faulty, so that the user can change other information processing devices for video conferencing as soon as possible to effectively solve the problems and inconveniences encountered by users.

The advantage and spirit of the invention may be understood by the following detailed descriptions together with the appended drawings.

BRIEF DESCRIPTION OF THE APPENDED DRAWINGS

FIG. 7A and FIG. 7B illustrate schematic diagrams of the pin configurations of the socket of port and the plug of connecting cable supporting the USB Type-C standard respectively.

DETAILED DESCRIPTION OF THE INVENTION

Figure 1:
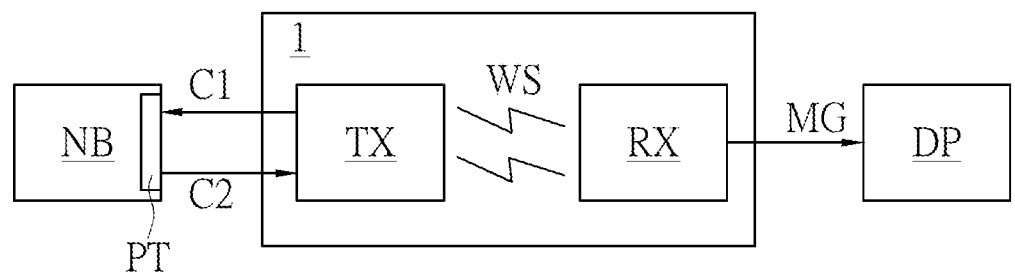
FIG. 1 illustrates a functional block diagram of the video conferencing system in accordance with a preferred embodiment of the invention.

A preferred embodiment of the invention is a video conferencing system. Please refer to FIG. 1. FIG. 1 illustrates a functional block diagram of the video conference system in this embodiment.

As shown in FIG. 1, the video conferencing system 1 is coupled between an information processing device NB and a display device DP. The video conferencing system 1 includes a transmitter TX and a receive RX. The transmitter TX is coupled to the information processing device NB. The receive RX is coupled to the display device DP. The transmitter TX and the receive RX communicate with each other wirelessly.

When the user connects the transmitter TX to the port PT of the information processing device NB, the transmitter TX will communicate with the information processing device NB to determine whether the port PT of the information processing device NB has video output function or not.

In detail, the port PT of the information processing device NB is a USB Type-C port, and the transmitter TX is coupled the port PT of the information processing device NB through a connecting cable supporting the USB Type-C alternate mode, so that the power negotiation can be performed between the transmitter TX and the information processing device NB, and the transmitter TX and the information processing device NB can exchange messages with each other during the power negotiation process.

In an embodiment, during the power negotiation process between the transmitter TX and the information processing device NB, when the transmitter TX transmits a communication message C1 related to the USB Type-C alternate mode to the information processing device NB, if the transmitter TX fails to receive a response message C2 from the information processing device NB, the transmitter TX will determine whether the port PT of the information processing device NB has a video output function or not, but not limited to this.

In another embodiment, when the transmitter TX is coupled to the port PT of the information processing device NB, if an image output trigger button of the transmitter TX is pressed, it means that the user wants to output the image signal of the information processing device NB to the transmitter TX and then wirelessly transmit the image signal to the receive RX through the transmitter TX. Therefore, the transmitter TX will determine whether the port PT of the information processing device NB has the video output function or not, but not limited to this.

In practical applications, when the transmitter TX is coupled to the port PT of the information processing device NB, the information processing device NB functions as a USB host and the transmitter TX functions as a USB device. A USB device chip is disposed in the transmitter TX and a USB host chip is disposed in the information processing device NB. During the communication process between the transmitter TX and the information processing device NB, the USB device chip of the transmitter TX can obtain the output mode setting of the USB host chip of the information processing device NB.

In an embodiment, when the transmitter TX wants to determine whether the port PT of the information processing device NB has the video output function, the transmitter TX can first determine whether the output mode setting of the USB host chip of the information processing device NB is the DisplayPort output mode or not, and then determine whether the port PT of the information processing device NB has the video output function based on the above determination result.

If the output mode setting of the USB host chip of the information processing device NB is the DisplayPort output mode, the transmitter TX determines that the port PT of the information processing device NB has the video output function; if the output mode setting of the USB host chip of the information processing device NB is not the DisplayPort output mode, the transmitter TX determines that the port PT of the information processing device NB has no video output function.

When the transmitter TX determines that the port PT of the information processing device NB has the video output function, the transmitter TX will receive the image signal outputted by the information processing device NB through the port PT and convert the image signal into an internet protocol (IP) packet and then wirelessly transmit it to the receive RX. The receive RX will convert the IP packet back to the image signal and then output it to the display device DP for displaying.

When the transmitter TX determines that the port PT of the information processing device NB has no video output function, the transmitter TX will transmit a wireless signal WS to the receive RX. When the receive RX receives the wireless signal WS, the receive RX will provide a default warning message MG to the display device DP, and the display device DP will display the default warning message MG.

It should be noted that the transmitter TX can also determine whether the output mode setting of the USB host chip of the information processing device NB is other video signal output mode to determine whether the port PT of the information processing device NB has the video output function, it is not limited by the above embodiments.

In an embodiment, the default warning message MG can be an image signal pre-stored by the transmitter TX. When the transmitter TX determines that the port PT of the information processing device NB has no video output function, the transmitter TX will transmit the default warning message MG to the receive RX through the wireless signal WS, and then the receive RX will provide the default warning message MG to the display device DP. When the display device DP receives the default warning message MG, the display device DP will display the default warning message MG to inform the user that the port PT of the information processing device NB used by the user has no video output function.

In another embodiment, the default warning message MG can be an image signal pre-stored by the receive RX. When the receive RX receives the wireless signal WS from the transmitter TX, the receive RX will transmit the default warning message MG to the display device DP. When the display device DP receives the default warning message MG, the display device DP will display the default warning message MG to inform the user that the port PT of the information processing device NB used by the user has no video output function.

In practical applications, the form of the default warning message MG is not limited, and can include one or more of different forms such as characters, symbols, patterns, images, sounds, etc., as long as the effect of alerting the users can be achieved.

Figure 2:
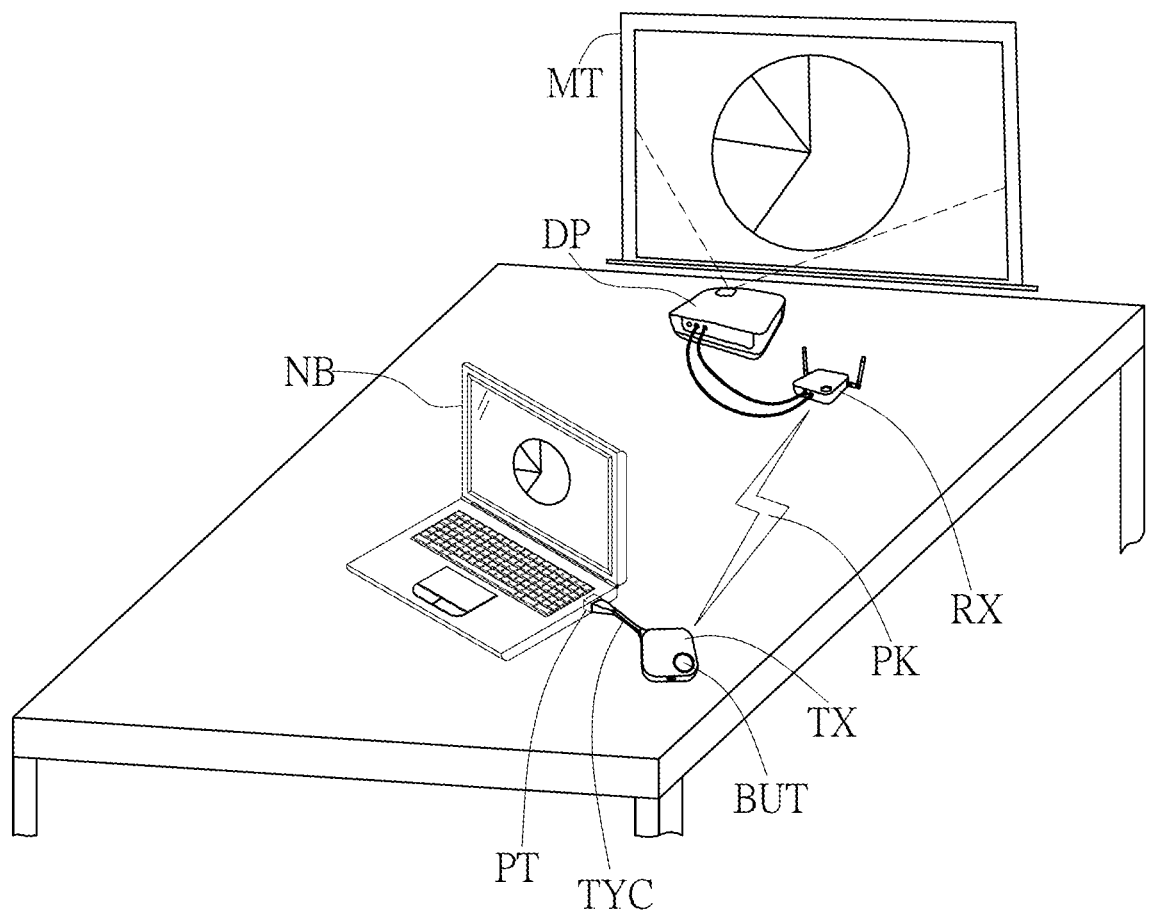
FIG. 2 illustrates a schematic diagram of an application scenario of the video conferencing system of the invention.

Please refer to FIG. 2. FIG. 2 illustrates a schematic diagram of an application scenario of the video conferencing system of the invention. As shown in FIG. 2, when the transmitter TX is coupled to the port PT of the information processing device NB through the connecting cable TYC supporting the USB Type-C alternate mode, the transmitter TX will communicate with the information processing device NB.

If the transmitter TX fails to receive the response of the information processing device NB during the communication with the information processing device NB, or an image output trigger button BUT of the transmitter TX is pressed, the transmitter TX will determine whether the port PT of the information processing device NB has the video output function.

When the transmitter TX determines that the port PT of the information processing device NB has the video output function, the transmitter TX will receive the image signal outputted by the information processing device NB through the port PT and then convert the image signal into an internet protocol (IP) packet PK and wirelessly transmit it to the receiver RX. After the receiver RX converts the IP packet PK into the image signal and outputs it to the display device DP, the display device DP will project the image signal onto the display monitor MT. Thus, when the port PT of the information processing device NB has the video output function, the display monitor MT can display the same frame as the information processing device NB through the video conference system 1 of the invention.

Figure 3:
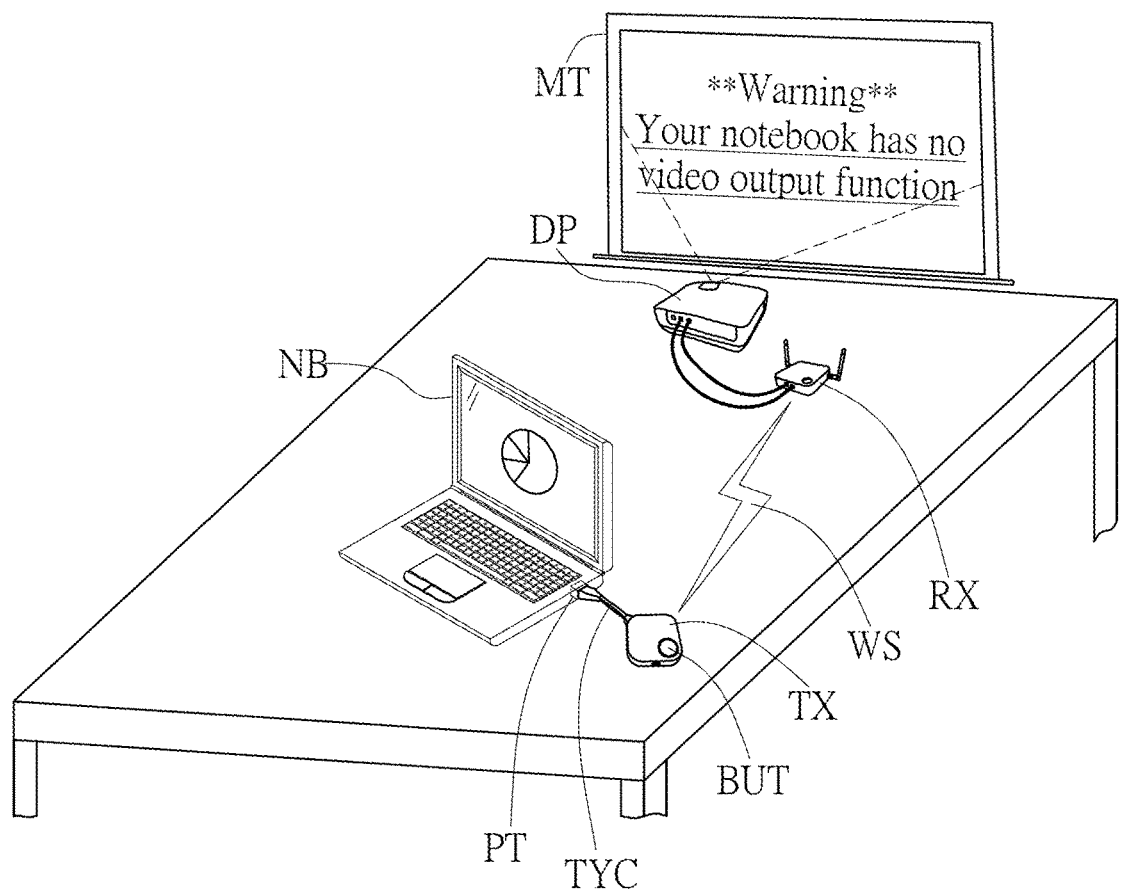
FIG. 3 illustrates a schematic diagram of another application scenario of the video conferencing system of the invention.

Please refer to FIG. 3. FIG. 3 illustrates a schematic diagram of another application scenario of the video conferencing system of the invention. As shown in FIG. 3, when the transmitter TX determines that the port PT of the information processing device NB has no video output function, the transmitter TX will transmit the wireless signal WS to the receiver RX. When the receiver RX receives the wireless signal WS, the receiver RX will provide a default warning message MG to the display device DP, and the display device DP will project the default warning message MG onto the display monitor MT.

Therefore, when the port PT of the information processing device NB has no video output function, the display monitor MT fails to display the same frame as the information processing device NB. Through the video conferencing system 1 of the invention, the display monitor MT can display the default warning message MGM pre-stored by the transmitter TX or the receiver RX, thereby reminding the user that the port PT of the information processing device NB has no video output function.

Figure 4:
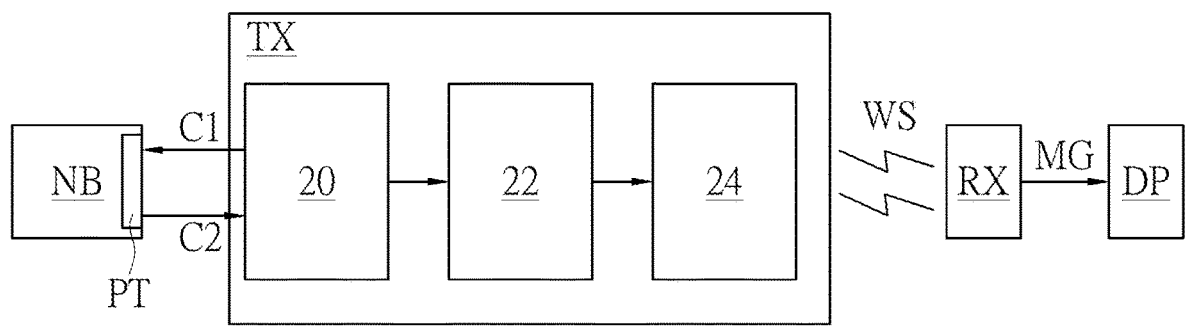
FIG. 4 illustrates a functional block diagram of a transmitter in another preferred embodiment of the invention.

Please refer to FIG. 4. FIG. 4 illustrates a functional block diagram of the transmitter in another preferred embodiment of the invention. As shown in FIG. 4, the transmitter TX includes a communication circuit 20, a control circuit 22, and a wireless transmitting circuit 24. The control circuit 22 is coupled to the communication circuit 20. The wireless transmitting circuit 24 is coupled to the control circuit 22.

When the transmitter TX is coupled to the port PT of the information processing device NB, the transmitter TX communicates with the information processing device NB through the communication circuit 20. The control circuit 22 determines whether the connection port PT of the information processing device NB has a video output function based on the communication result between the communication circuit 20 and the information processing device NB.

When the control circuit 22 determines that the connection port PT of the information processing device NB does not have the video output function, the control circuit 22 will control the wireless transmitting circuit 24 to transmit the wireless signal WS to the receiver RX. When the receiver RX receives the wireless signal WS, the receiver RX will provide the default warning message MG to the display device DP for displaying.

In an embodiment, the default warning message MG can be an image signal pre-stored by the transmitter TX. When the control circuit 22 determines that the connection port PT of the information processing device NB does not have the video output function, the wireless transmission circuit 24 will transmit the default warning message MG to the receiver RX through the wireless signal WS, and then the receiver RX will transmit the default warning message MG to the display device DP for displaying.

In another embodiment, the default warning message MG can be an image signal pre-stored by the receiver RX. When the receiver RX receives the wireless signal WS from the wireless transmission circuit 24, the receiver RX will transmit its pre-stored default warning message MG to the display device DP for displaying.

Figure 5:
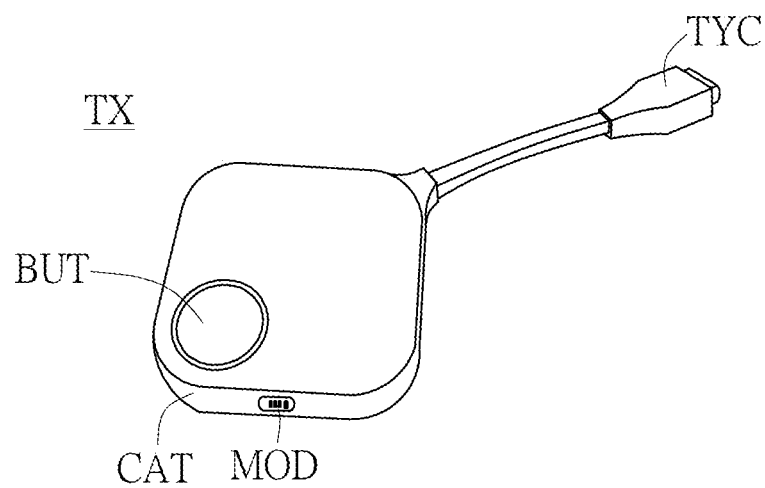
FIG. 5 illustrates a schematic diagram of the appearance of the transmitter of the invention.

Please refer to FIG. 5. FIG. 5 illustrates a schematic diagram showing the appearance of the transmitter TX in the video conference system 1. As shown in FIG. 5, the transmitter TX can include a casing CAT, an image output trigger button BUT, a mode button MOD and a connecting cable TYC. In this embodiment, the connecting cable TYC supports the USB Type-C alternate mode; the image output trigger button BUT is disposed on the casing CAT and the mode button MOD is disposed on the side of the casing CAT, but not limited to this.

When the user presses the image output trigger button BUT, the transmitter TX will start or stop wirelessly transmitting the image signal to the receiver RX. When the user presses the mode button MOD, different operating modes such as a transmitter TX and receiver RX pairing mode, a projection mode or a video playing mode can be switched. The connecting cable TYC supporting the USB Type-C alternate mode is coupled to the connection port PT of the information processing device NB, which can transmit different signals such as data, video and power, and it can support different USB Type-C format such as Type-C 2.0, Type-C 3.0, Type-C 3.1 (Gen') or Type-C 3.1 (Gen2), but not limited to this.

Figure 6:
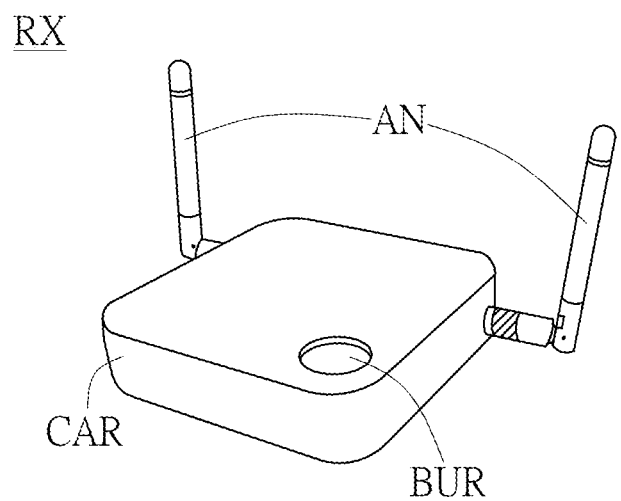
FIG. 6 illustrates a schematic diagram of the appearance of a receiver of the invention.

Please refer to FIG. 6. FIG. 6 illustrates a schematic diagram showing the appearance of the receiver RX in the video conference system 1. As shown in FIG. 6, the receiver RX can include a casing CAR, a switch button BUR and an antenna AN. The switch button BUR disposed on the casing CAR can have a light-emitting diode indicator for the user to turn on or turn off the receiver RX. The antenna AN disposed on both sides of the casing CAR is used to receive the wireless signal WS transmitted from the transmitter TX.

Please refer to FIG. 7A and FIG. 7B. FIG. 7A and FIG. 7B illustrate schematic diagrams of the pin configurations of the socket of port and the plug of connecting cable supporting the USB Type-C standard respectively. It can be found from FIG. 7A and FIG. 7B that, compared with the conventional USB standard, the pin configurations including the high-speed transmission pins TX1+/TX1−, TX2+/TX2−, RX1+/RX1− and RX2+/RX2− with high-speed signal transmission capability of 10 Gbps, the system configuration pin CC1/CC2, the connector power supply pin VCONN are added to the USB Type-C standard.

It should be noted that the plug of connecting cable supporting the USB Type-C standard is reversible. In other words, the plug of connecting cable supporting the USB Type-C standard will be connected correctly, either in the forward or reverse direction, to the socket of port supporting the USB Type-C standard.

In addition, since the socket of port supporting the USB Type-C standard includes two pairs of data pins D+/D− connected to each other, no matter the plug of connecting cable supporting the USB Type-C standard is inserted in the forward or reverse direction to the socket of port supporting the USB Type-C standard, the data pins D+/D− will be connected.

For the USB Type-C standard, the high-speed transmission pins for high-speed signal transmission cannot be connected together. Therefore, the socket of port supporting the USB Type-C standard can detect whether the plug of connecting cable supporting the USB Type-C standard is inserted in the forward or reverse direction to the socket of port supporting the USB Type-C standard through the system configuration pin CC1/CC2, and route the high-speed transmission pins TX1+/TX1−, TX2+/TX2−, RX1+/RX1−, and RX2+/RX2− through the hardware wires to ensure the pin configuration of the USB Type-C standard is correct.

It should be noticed that the USB Type-C standard introduces a dual role capability compared to the conventional USB Standard. Since each plug of connecting cable supporting the USB Type-C standard has exactly the same upper and lower sides, when two devices supporting the USB Type-C standard are coupled to each other, these two devices should mutually communicate to determine their respective roles as USB host or USB device.

In detail, the above-mentioned role communication process needs to be performed for data transmission and power transmission respectively, and it should be performed after the plug of connecting cable supporting the USB Type-C standard is inserted into the socket of port supporting the USB Type-C standard. As to data transmission, a port of a device as USB host is called a downstream facing port (DFP) and a port of a device as USB device is called an upstream facing port (UBP). As to power transmission, a device that supplies power is called as a source and a device that receives power is called as a sink. The system configuration pins CC1 and CC2 are used to define the power roles played by the two devices when the two devices are coupled.

Figure 8:
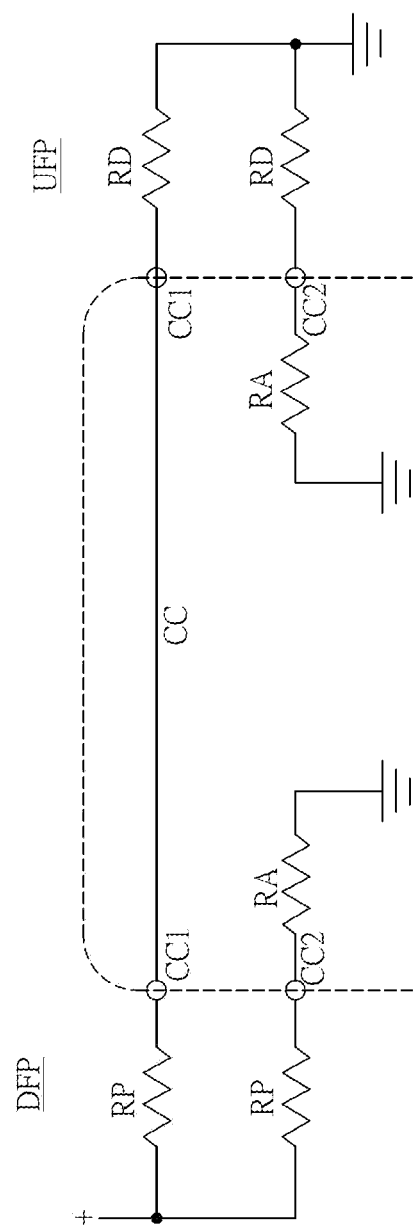
FIG. 8 illustrates a schematic diagram of the downlink port and the uplink port coupled through the connecting cable.

As shown in FIG. 8, the downstream facing port DFP (the source) and the upstream facing port UFP (the sink) are coupled through the connecting cable CC, and the system configuration pins CC1 and CC2 of the downstream facing port DFP are coupled to the pull-up resistor RP and the system configuration pins CC1 and CC2 of the upstream facing port UFP are coupled to the pull-down resistor RD. When the downstream facing port DFP is not coupled to the upstream facing port UFP, the power supply pin VBUS of the downstream facing port DFP has no output. When the upstream facing port UFP is coupled to the downstream facing port DFP through the connecting cable CC, the system configuration pin CC1 of the downstream facing port DFP is coupled with the system configuration pin CC1 of the upstream facing port UFP, so that the system configuration pin CC1 of the downstream facing port DFP detects the pull-down resistor RD of the upstream facing port UFP, which means that the upstream facing port UFP and the downstream facing port DFP are coupled, and the power supply pin VBUS of the downstream facing port DFP (the source) will output power to the upstream facing port UFP (the sink).

It should be noted that the above-mentioned embodiment is described by coupling the system configuration pin CC1 of the downstream facing port DFP to the system configuration pin CC1 of the upstream facing port UFP; in fact, as the direction that the plug of connecting cable is inserted into the socket of port is different, it can be also the system configuration pin CC2 of the downstream facing port DFP coupled to the system configuration pin CC2 of the upstream facing port UFP. Therefore, the downstream facing port DFP can determine whether the direction of the plug of connecting cable is inserted into the socket of port is forward or reverse according to that the system configuration pin CC1 or the system configuration pin CC2 of the downstream facing port DFP detects the pull-down resistor RD of the upstream facing port UFP, and correspondingly switches the configuration of the high-speed transmission pins TX1+/TX1−, TX2+/TX2−, RX1+/RX1− and RX2+/RX2−.

In addition, compared to the conventional USB standard, the USB Type-C standard can greatly improve the power supply capability. The conventional USB port can provide only a maximum power of 2.5 W, while the USB Type-C port can provide a maximum power of 15 W (i.e., 5V*3A). If the USB Type-C port uses the power deliver (PD) protocol, it can even provide a maximum power of 100 W (i.e., 20V*5A). Therefore, a large device such as a monitor can be powered by the USB Type-C port, and a device such as a notebook equipped with a large-capacity battery can be also charged through the USB Type-C port.

It should be noted that the high-speed transmission pins TX1+/TX1−, TX2+/TX2−, RX1+/RX1− and RX2+/RX2− supporting the USB Type-C standard can provide high-speed signal transmission capability up to 10 Gbps, so the high-speed signal transmission which conventionally requires a dedicated transmission line, such as signal transmission of high-definition multimedia interface (HDMI), DisplayPort, or Thunderbolt, can be transmitted through a USB Type-C cable, and even 4 k high-resolution video signals can be transmitted at high speed. The above-mentioned operation mode is called as USB Type-C alternate mode.

For example, when the transmitter TX is coupled to the USB Type-C port PT of the information processing device NB through the connecting cable TYC supporting the USB Type-C alternate mode, the information processing device NB as the source and the transmitter TX as the sink will communicate with each other to perform negotiation of the USB Type-C alternate mode.

Figure 9:
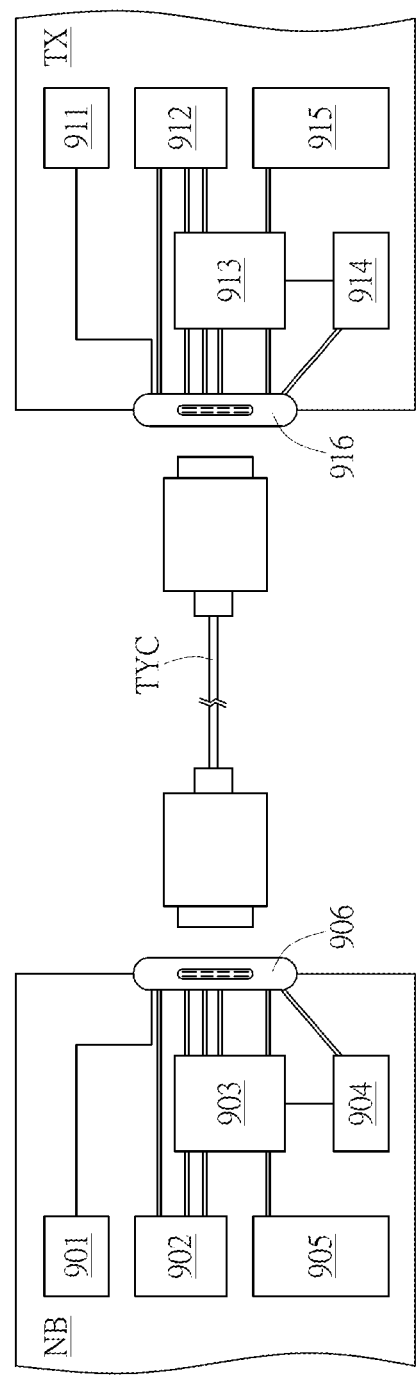
FIG. 9 illustrates a functional block diagram of the information processing device (source) and the transmitter (sink) coupled through the connecting cable.

As shown in FIG. 9, the information processing device NB as a source can include a power 901, a USB host 902, a multiplexer 903, a power delivery controller 904, a DisplayPort source 905 and a USB Type-C port 906; the transmitter TX as a sink can include a power 911, a USB device 912, a multiplexer 913, a power delivery controller 914, a DisplayPort sink 915 and a USB Type-C port 916. The USB Type-C port 906 of the source and the USB Type-C port 916 of the sink are coupled to each other through a connecting cable TYC supporting the USB Type-C alternate mode.

In practical applications, the USB Type-C port 906 of the source (i.e., the information processing device NB) can perform physical communication with the USB Type-C port 916 of the sink (i.e., the transmitter TX) through its power supply pin VBUS and system configuration pins CC1/CC2, and the communication process is detailed as follows:

At first, the information processing device NB as the source can determine the coupling state of the source and the sink based on whether the system configuration pin CC1/CC2 of the information processing device NB detects the pull-down resistor RD of the transmitter TX as the sink.

For example, when the system configuration pin CC1 of the source detects the pull-down resistor RD and the system configuration pin CC2 of the source is open, it represents that the source and the sink are coupled to each other; When the system configuration pin CC2 of the source detects the pull-down resistor RD and the system configuration pin CC1 of the source is open, it also represents that the source and the sink are coupled to each other. At this time, the information processing device NB as the source will output power to the transmitter TX as the sink through the power supply pin VBUS.

Next, the information processing device NB can determine whether the direction in which the connecting cable TYC is inserted into the port PT is forward or reverse according to which one of the system configuration pins CC1 and CC2 detects the pull-down resistance RD of the transmitter TX, and switch the configuration of the high-speed transmission pins TX1+/TX1−, TX2+/TX2−, RX1+/RX1− and RX2+/RX2− correspondingly to determine the output path of the USB signal. In addition, the information processing device NB as the source will also determine whether the connecting cable power supply pin VCONN needs to provide power to the connecting cable TYC supporting the connecting cable power supply pin VCONN for charging.

After the above-mentioned power supply determining procedures have been completed, it begins to detect whether the port PT of the information processing device NB as the downstream facing port DFP supports the USB Type-C alternate mode.

USB power delivery (PD) is transmitted through the system configuration pins CC1/CC2. The USB PD has a vendor defined message (VDM) function for defining the identification of the transmitter TX as a USB device. When the information processing device NB determines that the transmitter TX supports DisplayPort signal (or PCIe signal) output function based on the identification of the transmitter TX, the port PT of the information processing device NB as the downstream facing port DFP will enter the alternate mode.

In an embodiment, if the information processing device NB determines that the transmitter TX supports the DisplayPort signal output function, the high-speed transmission pins TX1+/TX1−, TX2+/TX2−, RX1+/RX1− and RX2+/RX2− originally used to transmit the USB signal can be changed to transmit the DisplayPort signal in the alternate mode, but not limited to this. Since the USB signal and the DisplayPort signal both include four pairs of differential signals, it can be completely replaced.

In addition, in the alternate mode, the USB signal and the DisplayPort signal can be simultaneously transmitted. For example, the high-speed transmission pins TX1+/TX1− and RX1+/RX1− are used to transmit the USB signal, and the high-speed transmission pins TX2+/TX2− and RX2+/RX2− are used to transmit the DisplayPort signal, but not limited to this. The advantage of this method is that the same port can use both devices at the same time without disposing any chips, only through the conversion line.

In another embodiment, if the information processing device NB determines that the transmitter TX supports the PCIe signal output function, the high-speed transmission pins TX1+/TX1−, TX2+/TX2−, RX1+/RX1− and RX2+/RX2− originally used to transmit the USB signal can be changed to transmit PCIe signals in the alternate mode.

In addition, in the alternate mode, the USB signal and the PCIe signal can be simultaneously transmitted; for example, the high-speed transmission pins TX1+/TX1− and RX1+/RX1− are used to transmit the USB signal, and the high-speed transmission pins TX2+/TX2− and RX2+/RX2− are used to transmit the PCIe signals, but not limited to this. The advantage of this method is that the same port can use both devices at the same time without disposing any chips, only through the conversion line.

Figure 10:
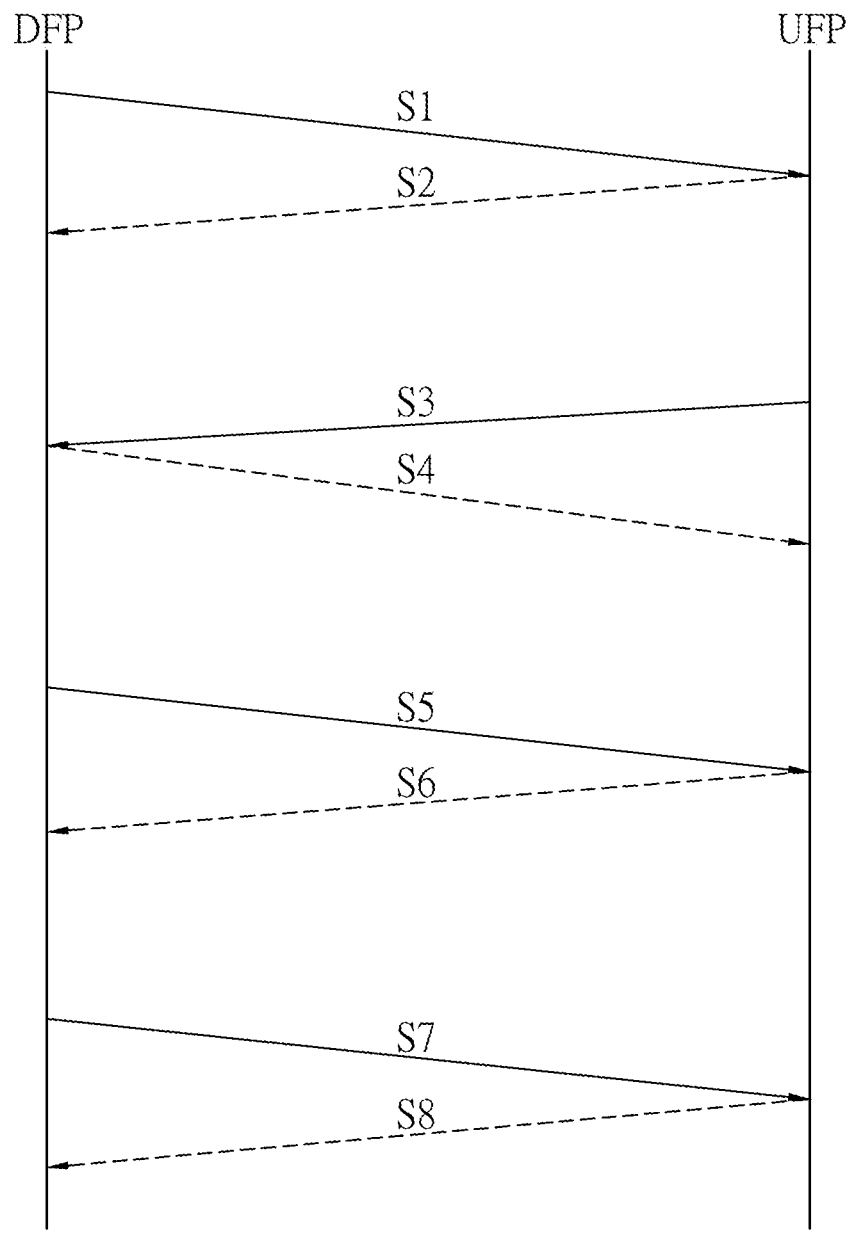
FIG. 10 illustrates a schematic diagram of the power supply information exchange during the power negotiation process between the downlink port as the source and the uplink port as the sink.

Please refer to FIG. 10. FIG. 10 is a schematic diagram of a power delivery message exchange during a power negotiation process between a downstream facing port DFP as a source and an upstream facing port UFP as a sink.

As shown in FIG. 10, at first, the downstream facing port DFP as the source transmits the source capabilities message S1 to the upstream facing port UFP as the sink. When the downstream facing port DFP receives the reply message S2 of the upstream facing port UFP, the power supply connection between the downstream facing port DFP and the upstream facing port UFP is completed.

Next, the upstream facing port UFP will analyze the received source function message S1 and select the power profile to be requested, and then transmit a request message S3 to the downstream facing port DFP. After the downstream facing port DFP receives the request message S3, the downstream facing port DFP will transmit a reply message S4 to the upstream facing port UFP, so that the upstream facing port UFP can know that the downstream facing port DFP has received the request message S3.

Then, the downstream facing port DFP will analyze the received request message S3 and determines whether the power profile requested by the upstream facing port UFP is acceptable. If the downstream facing port DFP decides to accept the power profile requested by the upstream facing port UFP, the downstream facing port DFP will transmit an accept message S5 to the upstream facing port UFP. After the upstream facing port UFP receives the accept message S5, the upstream facing port UFP will transmit a reply message S6 to the downstream facing port DFP, so that the downstream facing port DFP can know that the upstream facing port UFP has received the accept message S5.

After the downstream facing port DFP switches to the power profile requested by the upstream facing port UFP, the downstream facing port DFP will transmit a Ready message S7 to the upstream facing port UFP, so that the upstream facing port UFP can know that the downstream facing port DFP has been switched to the power profile requested by the upstream facing port UFP. After the upstream facing port UFP receives the ready message S7, the upstream facing port UFP will transmit a reply message S8 to the downstream facing port DFP, so that the downstream facing port DFP can know that the upstream facing port UFP has received the ready message S7. At this time, the power negotiation process between the downstream facing port DFP and the upstream facing port UFP has been successfully completed, and the downstream facing port DFP and the upstream facing port UFP will begin to operate according to the new power supply.

Compared to the prior art, when the user connects the transmitter in the video conferencing system of the invention to the port of the information processing device, if the transmitter communicates with the information processing device and then determines that the port of the information processing device has no video output function, the transmitter will transmit a wireless signal to the receiver, and the receiver will provides a default warning message to the display device to notify the user that the information processing device used by the user has no video output function and fails to perform video conference.

By doing so, the user can clearly know that the real reason why the video conference cannot be smoothly carried out is that the information processing device has no video output function, and the user will not misunderstand that the information processing device or the video conference system is faulty, so that the user can change other information processing devices for video conferencing as soon as possible to effectively solve the problems and inconveniences encountered by users.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video conferencing system, coupled between an information processing device and a display device, the video conferencing system comprising:
   a transmitter, when the transmitter is coupled to a port of the information processing device, the transmitter being configured to communicate with the information processing device to determine whether the port of the information processing device has a video output function or not, when the above determination result is no, the transmitter being configured to output a wireless signal; and
   a receive, coupled to the display device and configured to receive the wireless signal and provide a default warning message to the display device.

2. The video conferencing system of claim 1, wherein the default warning message is an image signal pre-stored by the transmitter and transmitted to the receive through the wireless signal.

3. The video conferencing system of claim 1, wherein the default warning message is an image signal pre-stored by the receive, the display device is configured to receive the default warning message and directly display the default warning message.

4. The video conferencing system of claim 1, wherein the port of the information processing device is a universal serial bus (USB) Type-C port, the transmitter is coupled to the port of the information processing device through a connecting cable supporting a USB Type-C alternate mode, the transmitter and the information processing device are configured to perform a power negotiation and exchange messages with each other.

5. The video conferencing system of claim 4, wherein a USB device chip of the transmitter is configured to obtain an output mode setting of a USB host chip of the information processing device; if the output mode setting is not a DisplayPort output mode, the transmitter is configured to determine that the port of the information processing device has no video output function.

6. The video conferencing system of claim 1, wherein when the transmitter transmits a communication message related to a USB Type-C alternate mode to the information processing device but fails to receive a response message from the information processing device, the transmitter is configured to determine whether the port of the information processing device has the video output function or not.

7. The video conferencing system of claim 1, wherein when an image output trigger button of the transmitter is pressed, the transmitter is configured to determine whether the port of the information processing device has the video output function or not.

8. A transmitter, applied to a video conferencing system, the video conferencing system further comprising a receiver, the transmitter comprising:
   a communication circuit, when the transmitter is coupled to a port of an information processing device, the communication circuit being configured to communicate with the information processing device;
   a control circuit, coupled to the communication circuit and configured to determine whether the port of the information processing device has a video output function or not; and
   a wireless transmitting circuit, coupled to the control circuit, when a determination result of the control circuit is no, the wireless transmitting circuit being configured to output a wireless signal, and the receiver being configured to receive the wireless signal and provide a default warning message to a display device.

9. The transmitter of claim 8, wherein the default warning message is an image signal pre-stored by the transmitter and transmitted to the receiver through the wireless signal.

10. The transmitter of claim 8, wherein the default warning message is an image signal pre-stored by the receiver, the display device is configured to receive the default warning message and directly display the default warning message.

11. The transmitter of claim 8, wherein the port of the information processing device is a universal serial bus (USB) Type-C port, the transmitter is coupled to the port of the information processing device through a connecting cable supporting a USB Type-C alternate mode, the transmitter and the information processing device are configured to perform a power negotiation and exchange messages with each other.

12. The transmitter of claim 11, wherein a USB device chip of the transmitter is configured to obtain an output mode setting of a USB host chip of the information processing device; if the output mode setting is not a DisplayPort output mode, the control circuit is configured to determine that the port of the information processing device has no video output function.

13. The transmitter of claim 8, wherein when the transmitter transmits a communication message related to a USB Type-C alternate mode to the information processing device but fails to receive a response message from the information processing device, the control circuit is configured to determine whether the port of the information processing device has the video output function or not.

14. The transmitter of claim 8, wherein when an image output trigger button of the transmitter is pressed, the control circuit is configured to determine whether the port of the information processing device has the video output function or not.

* * * * *